United States Patent
Huang et al.

(10) Patent No.: US 11,948,168 B2
(45) Date of Patent: Apr. 2, 2024

(54) WEB ADVERTISEMENT CHANGE MONITORING METHOD, DEVICE AND STORAGE MEDIUM

(71) Applicant: SHANGHAI HODE INFORMATION TECHNOLOGY CO., LTD., Shanghai (CN)

(72) Inventors: Shengsheng Huang, Shanghai (CN); Anxin Wu, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 11 days.

(21) Appl. No.: 17/599,869

(22) PCT Filed: Dec. 16, 2019

(86) PCT No.: PCT/CN2019/125520
§ 371 (c)(1),
(2) Date: Sep. 29, 2021

(87) PCT Pub. No.: WO2020/199649
PCT Pub. Date: Oct. 8, 2020

(65) Prior Publication Data
US 2022/0198513 A1 Jun. 23, 2022

(30) Foreign Application Priority Data
Mar. 29, 2019 (CN) .......................... 201910249153.2

(51) Int. Cl.
*G06Q 30/0241* (2023.01)
*G06T 7/20* (2017.01)

(52) U.S. Cl.
CPC ..... *G06Q 30/0248* (2013.01); *G06Q 30/0277* (2013.01); *G06T 7/20* (2013.01)

(58) Field of Classification Search
CPC .................. G06Q 30/02–0277; G06T 7/20
See application file for complete search history.

(56) References Cited

U.S. PATENT DOCUMENTS

| 2005/0021387 A1 | 1/2005 | Gottfurcht |
| 2014/0283002 A1 | 9/2014 | Frechette |

FOREIGN PATENT DOCUMENTS

| CN | 106202101 A | 12/2016 |
| CN | 106899864 A | 6/2017 |

(Continued)

OTHER PUBLICATIONS ip.com titled "Method of Monitoring Updated Web Pages for Desired Content Changes" Jul. 22, 2015 (Year: 2015).*

(Continued)

*Primary Examiner* — Raquel Alvarez
(74) *Attorney, Agent, or Firm* — BakerHostetler

(57) ABSTRACT

The method, device and computer-readable storage medium of monitoring changes of web advertisements described in the present disclosure belong to a technical field of the Internet. The method of monitoring changes of web advertisements comprises loading a monitored page, storing the monitored page in a form of pictures, wherein the monitored page comprises an advertisement object; comparing the stored picture with a pre-stored picture of the monitored page and determining whether the advertisement on the monitored page is changed.

14 Claims, 2 Drawing Sheets

(56) References Cited

FOREIGN PATENT DOCUMENTS

| | | | | |
|---|---|---|---|---|
| CN | 107103070 A | | 8/2017 | |
| CN | 108073631 A | * | 5/2018 | ........... G06F 16/986 |
| CN | 108073631 A | | 5/2018 | |
| CN | 108235122 A | | 6/2018 | |
| CN | 108595304 A | | 9/2018 | |
| CN | 108880921 A | | 11/2018 | |
| CN | 109978626 A | | 7/2019 | |

OTHER PUBLICATIONS

International Patent Application No. PCT/CN2019/125520; Int'l Search Report; dated Mar. 18, 2020; 2 pages.

* cited by examiner

Loading a monitored page, and storing the monitored page in a form of a picture, and obtaining a current page sample picture of the monitored page; wherein the monitored page comprises an advertisement object Comparing the current page sample picture with an initial pre-stored picture of the monitored page and determining whether the advertisement object of the monitored page is changed

Fig. 1

WEB ADVERTISEMENT CHANGE MONITORING METHOD, DEVICE AND STORAGE MEDIUM

CROSS-REFERENCE TO RELATED APPLICATION

The present application is the U.S. National Stage of International Application No. PCT/CN2019/125520, filed on Dec. 16, 2019, which claims priority to Chinese Patent Application No. CN201910249153.2, filed on Mar. 29, 2019, the disclosure of which is incorporated herein by reference in their entireties.

TECHNICAL FIELD

The present invention relates to a field of Internet technology, in particular to a field of web page technology, and specifically refers to a web advertisement change monitoring method, device and computer-readable storage medium.

BACKGROUND

Web page advertising is an important form of advertising on the current Internet. According to relevant laws and regulations, Internet medium need to review the content of their advertisements. Some advertisers may use one page when the advertisement landing page is submitted for review, and then modify it to another page after passing the review to avoid review. In order to identify and prevent such operations, it is necessary to be able to monitor changes of the customer's landing page, and notify reviewers when changes are found.

The current common monitoring implementation scheme is to monitor changes of source codes of a webpage, that is, a monitoring program downloads pages regularly and analyzes a difference of the page code between the downloaded pages and the previous version. If there is a difference, a warning is issued.

The monitoring scheme lies in the following issues:
i. For some pages that use dynamic web technology, some invisible contents may be modified when returning to the page. These changes do not affect viewers and should not be alerted. However, it is not easy to distinguish from the source codes, leading to a large number of false alarms.
ii. For problem i, some solutions may require users to manually mark the fields to be monitored, such as titles, keywords, etc., to avoid false alarms. However, this introduces a lot of extra manual operations, which is not executable for the advertising monitoring business that needs to process a large number of creatives.
iii. There is another problem with the source code-based monitoring method, that is, if the advertiser makes viewers to see different contents by replacing an image file on the page, this method is not recognized.

Therefore, how to provide an automatic and efficient webpage advertisement change monitoring method that is not based on the page source code and is closer to the user's visual observation experience has become an urgent problem in the field.

SUMMARY

The purpose of the present invention is to overcome the above-mentioned shortcomings in the prior art, and provide an automatic, accurate, convenient and efficient webpage advertisement change monitoring method, device, and computer-readable storage medium that is not based on the page source code and is closer to the user's visual observation experience.

In order to achieve the above-mentioned purpose, a web advertisement change monitoring method of the present invention includes the following steps:
(1) loading a monitored page, and storing the monitored page in a form of a picture, and obtaining a current page sample picture of the monitored page; wherein the monitored page comprises an advertisement object;
(2) comparing the current page sample picture with an initial pre-stored picture of the monitored page to determine whether the advertisement object of the monitored page is changed.

In the web advertisement change monitoring method, the step (2) specifically includes:
(21) obtaining a difference degree between the current page sample picture and the initial pre-stored picture of the monitored page according to a preset picture difference algorithm;
(22) determining whether the difference degree is greater than a preset threshold;
if a determination result is yes, it is determined that the advertisement object of the monitored page is changed;
if the determination result is no, it is determined that the advertisement object of the monitored page is not changed.

In the web advertisement change monitoring method, the preset picture difference algorithm is one or any combination of the following methods: Histogram Comparison Algorithms, Perceptual Hash Algorithms, and Different Hash Algorithms.

In the web advertisement change monitoring method, the obtaining a difference degree between the current page sample picture and the initial pre-stored picture of the monitored page, specifically includes:
obtaining an advertisement object of the current page sample picture and an advertisement object of the initially pre-stored picture;
taking the difference degree between the advertisement object of the current page sample picture and the advertisement object of the initial pre-stored picture as the difference degree between the current page sample picture and the initial pre-stored picture of the monitored page.

In the web advertisement change monitoring method, the difference degree between the advertisement object of the current page sample picture and the advertisement object of the initial pre-stored picture, is specifically:
if advertisement objects are added or deleted, considering the difference degree to be 100%.
if advertisement objects are not added or deleted, taking a pixel difference percentage between the advertisement object of the current page sample picture and the advertisement object of the initial pre-stored picture as the difference degree.

In the web advertisement change monitoring method, the taking pixel difference percentage between the advertisement object of the current page sample picture and the advertisement object of the initial pre-stored picture as the difference degree, specifically includes:
if the current page sample picture and the initial pre-stored picture both contain more than two advertisement objects, taking the pixel difference percentage with the largest difference degree among the two or more advertisement objects as the difference degree between the advertisement object of the current page sample picture and the advertisement object of the initial pre-stored picture.

In the web advertisement change monitoring method, the monitored page is stored as a picture, and the monitored page is a rendered web page.

The present application also provides a computer-readable storage medium, which stores computer programs, wherein when the computer programs are executed by a processor, the above-mentioned web advertisement change monitoring method is realized.

The present invention also provides a web advertisement change monitoring device, which includes a memory, a processor, and a computer program that stored in the memory, wherein when the computer program is executed by the processor, the above-mentioned web advertisement change monitoring method is realized.

Compared with the prior art, the embodiment of the present invention compares the stored pictures with the pre-stored pictures of the monitored page by loading the monitored page and storing the contents of the page in the form of pictures. Since the monitored page includes advertisement objects, therefore, it can be compared and determined whether an advertisement object in the monitored page is changed, so that when the advertisement object is changed, the corresponding reviewer can be reminded to deal with it in time. Thus, the monitoring based on page screenshots, is not based on page source codes, which can be closer to the user's visual observation experience, and the monitoring accuracy is higher, more efficient, and convenient. At the same time, the web advertisement change monitoring method, device and computer readable storage medium of the present invention have low implementation cost and a wide range of applications.

BRIEF DESCRIPTION OF THE DRAWINGS

FIG. 1 is a flowchart of the steps of the web advertisement change monitoring method of the present invention;

DETAILED DESCRIPTION OF ILLUSTRATIVE EMBODIMENTS

Figure 2:
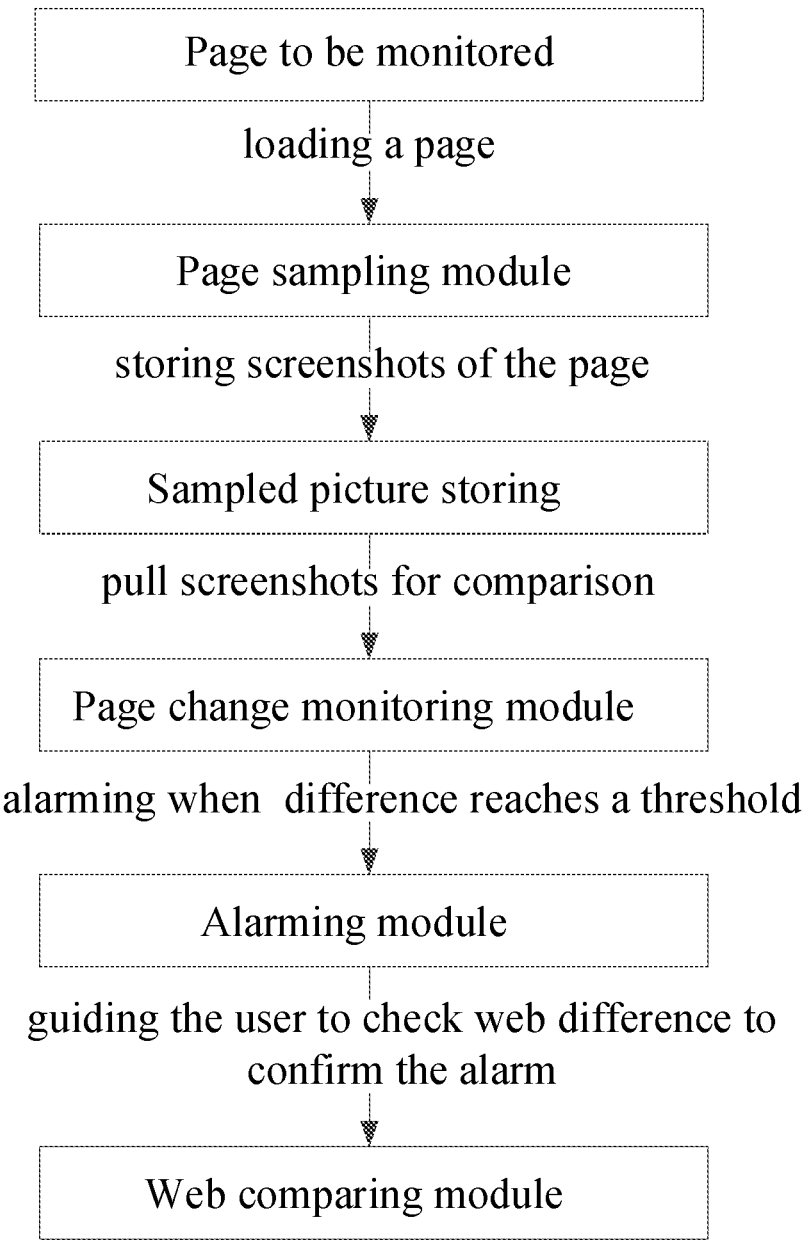
FIG. 2 is a schematic diagram of functional modules of a web advertisement change monitoring device of the present invention in practical application.

In order to understand the technical contents of the present invention more clearly, the following embodiments are specifically described in detail.

Please refer to FIG. 1, which is a flowchart of the steps of the web advertisement change monitoring of the present invention.

In practical applications, the web advertisement change monitoring method of the present invention can adopt a plurality of embodiments. The specific embodiments are explained by the following examples.

Embodiment 1

Divided by functional modules, the web page advertisement change monitoring device of the present invention is shown in FIG. 2 and may be mainly composed of a web sampling module, a sampled picture storing module, and a web comparing module.

The device is used to implement a web page advertisement change monitoring method, and the method correspondingly includes the following steps:

(1) loading a monitored page, and storing the monitored page in a form of a picture, and obtaining a current page sample picture of the monitored page; wherein the monitored page comprises an advertisement object.

The advertisement object refers to contents such as advertisement pictures or videos set in the monitored page. The advertisement object can take the form of pictures embedded in the page, banners, pop-up boxes or video players as needed.

Specifically, the web sampling module uses a browser to load the monitored page periodically, and renders the web through the browser, captures the content of the monitored page at that time in the form of pictures, and stores the current page sample picture to the sampled picture storing module according to the link, sampling time and other information. The process of loading the monitored page periodically can be performed at a preset time interval, such as once a week, once a day, or once an hour, etc. The interval can be set as required.

(2) comparing the current page sample picture with an initial pre-stored picture of the monitored page to determine whether the advertisement object of the monitored page is changed.

Specifically, the web comparing module compares the advertisement object in the current page sample picture obtained last time in the sample picture storing module with the advertisement object in a first current page sample picture obtained initially, to determine whether the advertisement object of the monitored page is changed. Wherein, the first current page sample picture obtained initially may be a page picture used by the advertiser when the advertisement landing page is submitted for review. In actual operation, the first current page sample picture obtained initially may also be a picture of the monitored page obtained during the previous monitoring process. In the case that the embodiment only compares the advertisement part, a certain area in the page can be preset to be the advertisement part, and only the part of the picture is saved when the picture is saved, and then the obtained picture is compared with the advertisement preset picture.

In the embodiment, the web comparing module obtains a difference degree between the current page sample picture and the initial pre-stored picture of the monitored page according to a preset picture difference algorithm, then determines whether the difference degree is greater than a preset threshold. If the determination result is yes, it is determined that the advertisement object of the monitored page is changed, at this time, it is considered that the page is changed and an alert is sent to the reviewer. If the determination result is no, it is determined that the advertisement object of the monitored page is not changed.

Specifically, the preset threshold may be preset by a technician or issued in advance by a cloud server through model training. The preset picture difference algorithm is one or any combination of the following methods: Histogram Comparison Algorithms, Perceptual Hash Algorithms, and Different Hash Algorithms. Wherein, when the preset picture difference algorithm is a combination of the above methods, the difference degree can be calculated by pre assigning the weight of the algorithm.

More specifically, when the difference degree between the current page sample picture and the initial pre-stored picture of the monitored page is obtained, the advertisement object of the current page sample picture and the advertisement object of the initially pre-stored picture can be obtained firstly, then the difference degree between the advertisement object of the current page sample picture and the advertisement object of the initial pre-stored picture is taken as the difference degree between the current page sample picture and the initial pre-stored picture of the monitored page.

In the embodiment, the Histogram Comparison Algorithms are taken as an example, that is, the histograms of two pictures are calculated separately, and then they are normalized to the same scale space, and then a similarity algorithm is used to calculate the distance, including Chi-square calculation, Bhattacharyya Distance and so on. It should be noted that the embodiment takes the content of the advertisement in the picture into account, and does not care about the color and brightness. Therefore, before the histogram is calculated, the two pictures are uniformly converted into black and white images and then compared, which can eliminate false alarms due to color and brightness adjustment, and further improve the contrast efficiency and accuracy.

It should be noted that when the determination result of step (2) is that the monitored page is changed, the method also includes the following steps:

(3) comparing and displaying the picture with the pre-stored picture of the monitored page.

At this time, the reviewers check the changes of the page sequence through the web comparing module to confirm whether it is a landing page change that needs to be processed, and if it meets the business conditions, proceed to the next step.

Embodiment 2

The difference from the first embodiment is that, in the web advertisement change monitoring method of the present invention, the difference degree between the current page sample picture and the initial pre-stored picture of the monitored page can be specifically carried out in the following way:

if advertisement objects are added or deleted, considering the difference degree to be 100%.

if advertisement objects are not added or deleted, taking a pixel difference percentage between the advertisement object of the current page sample picture and the advertisement object of the initial pre-stored picture as the difference degree.

It should be noted that when the current page sample picture and the initial pre-stored picture both contain more than two advertisement objects, the taking the pixel difference percentage between the advertisement object of the current page sample picture and the advertisement object of the initial pre-stored picture as the difference degree is specifically: taking the pixel difference percentage with the largest difference degree among the two or more advertisement objects as the difference degree between the advertisement object of the current page sample picture and the advertisement object of the initial pre-stored picture.

Embodiment 3

The difference from the first embodiment and the second embodiment is that the web advertisement change monitoring device of the present invention is shown in FIG. 2 and further comprises a web change monitoring module. The module is used to monitor whether the monitored page is modified, and once the monitored page is modified, the step (1) is run through the web sampling module.

That is, the following steps are included before step (1):

(10) monitoring whether the monitored page is modified, and when a modification is monitored, go to step (1).

The monitoring whether the monitored page is modified, is specifically: monitoring whether the advertisement object in the monitored page is modified; and monitoring whether a new pre-stored advertisement picture is obtained. Monitoring to obtain a screenshot of the page content of the monitored page at the time can also be triggered based on the modification of the monitoring page. For example, when it is recognized through the page codes that the advertiser has modified original advertisement content, the monitoring process of the present invention can be directly started. For another example, advertisements are periodic and need to be replaced regularly, and in the process of replacing the advertisement, after the new advertisement is manually reviewed, the preset picture of the new advertisement can be obtained to replace the original advertisement, and the monitoring process can also be started at this time.

Embodiment 4

The difference from embodiments 1, 2 and 3 is that the object of image difference comparison can be to compare only the part of the advertisement, or to compare the whole page obtained by screenshot. In the case of comparing the whole page, after obtaining the whole page image, the advertisement preset picture can be to directly compared to find out whether there is a same or similar area. If not, the page advertisement can be directly determined to be modified.

Specifically, the web comparing module compares the latest current page sample image obtained in the sample image storing module with the first current page sample image initially obtained, and determines whether the advertisement object of the monitored page is changed. Wherein, the first current page sample picture obtained initially may be a page picture used by the advertiser when the advertisement landing page is submit for review. In actual operation, the first current page sample picture obtained initially may also be a picture of the monitored page obtained during the previous monitoring process.

Embodiment 5

The difference from the foregoing embodiments is that the web advertisement change monitoring method of the present invention can also be applied to video advertisement monitoring. When the monitoring object is a video advertisement on the page, a first frame or a key frame of the video can be intercepted for corresponding comparison, or a video can be obtained and compared with an entire pre-stored video advertisement to determine whether the advertisement has been modified without authorization.

Compared with the prior art, the web advertisement change monitoring method of the present invention has at least the following beneficial effects:

(1) the monitoring effect is relatively close to a result of human visual observation, which is more suitable for the scene of advertising landing page monitoring needs;
(2) not affected by invisible web code changes;
(3) it can be recognized that the advertiser has modified the page by replacing the image file.

The web advertisement change monitoring method, device and computer-readable storage medium of the invention are adopted. In the method, the monitored page is loaded firstly, and the content of the page is stored in the form of a picture, and the picture includes the advertisement object in the page; then, the stored picture is compared with the pre-stored picture of the monitored page to determine whether the advertisement on the monitored page is changed, and if the two are different, the corresponding reviewer can be reminded for processing in time. Therefore, monitoring based on the form of screenshots of the page is realized, which is not based on the source code of the page, and is closer to the user's visual observation experience, and the accuracy of the monitoring is higher, the monitoring method is more efficient and convenient. Further, the web advertisement change monitoring method, device and computer readable storage medium of the present invention have low implementation cost and a wide range of applications.

In the specification, the present invention has been described with reference to its specific embodiments. However, it is obvious that various modifications and changes can still be made without departing from the spirit and scope of the present invention. Therefore, the description and drawings should be regarded as illustrative rather than restrictive.

What is claimed is:

1. A method of monitoring changes of web advertisements, comprising:
   loading a monitored page, wherein the monitored page comprises at least one advertisement object;
   storing the monitored page in a form of pictures;
   obtaining a current page sample picture of the monitored page;
   comparing the current page sample picture with an initial pre-stored picture of the monitored page; and
   determining whether the at least one advertisement object in the monitored page is changed, wherein the determining whether the at least one advertisement object in the monitored page is changed further comprises determining a difference degree between the current page sample picture and the initial pre-stored picture of the monitored page, and wherein the determining a difference degree between the current page sample picture and the initial prestored picture of the monitored page further comprises:
      obtaining an advertisement object in the current page sample picture and an advertisement object in the initially pre-stored picture,
      determining a difference degree between the advertisement object in the current page sample picture and the advertisement object in the initial pre-stored picture as the difference degree between the current page sample picture and the initial pre-stored picture of the monitored page, wherein the determining a difference degree between the advertisement object in the current page sample picture and the advertisement object in the initial pre-stored picture further comprises determining a percentage of pixel differences between the advertisement object in the current page sample picture and the advertisement object in the initial pre-stored picture as the difference degree when no advertisement object is added or deleted,
      wherein the determining a percentage of pixel differences between the advertisement object in the current page sample picture and the advertisement object in the initial pre-stored picture as the difference degree further comprises:
         in response to detecting that both the current page sample picture and the initial pre-stored picture comprise more than two advertisement objects, determining a largest percentage of pixel differences among the more than two advertisement objects as the difference degree between the advertisement object in the current page sample picture and the advertisement object in the initial pre-stored picture.

2. The method according to claim 1, wherein the determining whether the at least one advertisement object in the monitored page is changed further comprises:
   determining the difference degree between the current page sample picture and the initial pre-stored picture of the monitored page using a preset picture difference algorithm;
   determining whether the difference degree is greater than a predetermined threshold;
   determining that the at least one advertisement object in the monitored page is changed based on determining that the difference degree is greater than the predetermined threshold; and
   determining that the at least one advertisement object in the monitored page is not changed based on determining that the difference degree is not greater than the predetermined threshold.

3. The method according to claim 2, wherein the preset picture difference algorithm comprises at least one of Histogram Comparison Algorithms, Perceptual Hash Algorithms, or Different Hash Algorithms.

4. The method according to claim 1, wherein the determining a difference degree between the advertisement object in the current page sample picture and the advertisement object in the initial pre-stored picture further comprises:
   determining that the difference degree is 100% based on detecting that any advertisement object has been added or deleted.

5. The method according to claim 1, wherein the monitored page is a rendered web page.

6. A non-transitory computer-readable storage medium, which stores computer programs, wherein when the computer programs are executed by a processor, the computer programs cause the processor to perform operations comprising:
   loading a monitored page, wherein the monitored page comprises at least one advertisement object;
   storing the monitored page in a form of pictures;
   obtaining a current page sample picture of the monitored page;
   comparing the current page sample picture with an initial pre-stored picture of the monitored page; and
   determining whether the at least one advertisement object in the monitored page is changed, wherein the determining whether the at least one advertisement object in the monitored page is changed further comprises determining a difference degree between the current page sample picture and the initial pre-stored picture of the monitored page, and wherein the determining a difference degree between the current page sample picture and the initial prestored picture of the monitored page further comprises:
      obtaining an advertisement object in the current page sample picture and an advertisement object in the initially pre-stored picture,
      determining a difference degree between the advertisement object in the current page sample picture and the advertisement object in the initial pre-stored picture as the difference degree between the current page sample picture and the initial pre-stored picture of the monitored page, wherein the determining a difference degree between the advertisement object in the current page sample picture and the advertisement object in the initial pre-stored picture further comprises determining a percentage of pixel differences between the advertisement object in the current page sample picture and the advertisement object in the initial pre-stored picture as the difference degree when no advertisement object is added or deleted, wherein the determining a percentage of pixel differences between the advertisement object in the current page sample picture and the advertisement object in the initial pre-stored picture as the difference degree further comprises:

in response to detecting that both the current page sample picture and the initial pre-stored picture comprise more than two advertisement objects, determining a largest percentage of pixel differences among the more than two advertisement objects as the difference degree between the advertisement object in the current page sample picture and the advertisement object in the initial pre-stored picture.

7. The non-transitory computer-readable storage medium of claim 6, wherein the determining whether the at least one advertisement object in the monitored page is changed further comprises:

determining the difference degree between the current page sample picture and the initial pre-stored picture of the monitored page using a preset picture difference algorithm;

determining whether the difference degree is greater than a predetermined threshold;

determining that the at least one advertisement object in the monitored page is changed based on determining that the difference degree is greater than the predetermined threshold; and determining that the at least one advertisement object in the monitored page is not changed based on determining that the difference degree is not greater than the predetermined threshold.

8. The non-transitory computer-readable storage medium of claim 6 wherein the determining a difference degree between the advertisement object in the current page sample picture and the advertisement object in the initial pre-stored picture further comprises:

determining that the difference degree is 100% based on detecting that any advertisement object has been added or deleted.

9. The non-transitory computer-readable storage medium of claim 6, wherein the monitored page is a rendered web page.

10. A device of monitoring changes of web advertisements, which comprises a memory and a processor, and computer programs are stored in the memory, wherein when the computer programs are executed by the processor, the computer programs cause the processor to perform operations comprising:

loading a monitored page, wherein the monitored page comprises at least one advertisement object;

storing the monitored page in a form of pictures;

obtaining a current page sample picture of the monitored page;

comparing the current page sample picture with an initial pre-stored picture of the monitored page; and determining whether the at least one advertisement object in the monitored page is changed, wherein the determining whether the at least one advertisement object in the monitored page is changed further comprises determining a difference degree between the current page sample picture and the initial pre-stored picture of the monitored page, and wherein the determining a difference degree between the current page sample picture and the initial pre-stored picture of the monitored page further comprises:

obtaining an advertisement object in the current page sample picture and an advertisement object in the initially pre-stored picture, determining a difference degree between the advertisement object in the current page sample picture and the advertisement object in the initial pre-stored picture as the difference degree between the current page sample picture and the initial pre-stored picture of the monitored page, wherein the determining a difference degree between the advertisement object in the current page sample picture and the advertisement object in the initial pre-stored picture further comprises determining a percentage of pixel differences between the advertisement object in the current page sample picture and the advertisement object in the initial pre-stored picture as the difference degree when no advertisement object is added or deleted, wherein the determining a percentage of pixel differences between the advertisement object in the current page sample picture and the advertisement object in the initial pre-stored picture as the difference degree further comprises:

in response to detecting that both the current page sample picture and the initial pre-stored picture comprise more than two advertisement objects, determining a largest percentage of pixel differences among the more than two advertisement objects as the difference degree between the advertisement object in the current page sample picture and the advertisement object in the initial pre-stored picture.

11. The device of claim 10, wherein the determining whether the at least one advertisement object in the monitored page is changed further comprises:

determining the difference degree between the current page sample picture and the initial pre-stored picture of the monitored page using a preset picture difference algorithm;

determining whether the difference degree is greater than a predetermined threshold;

determining that the at least one advertisement object in the monitored page is changed based on determining that the difference degree is greater than the predetermined threshold; and determining that the at least one advertisement object in the monitored page is not changed based on determining that the difference degree is not greater than the predetermined threshold.

12. The device of claim 11, wherein the preset picture difference algorithm comprises at least one of Histogram Comparison Algorithms, Perceptual Hash Algorithms, or Different Hash Algorithms.

13. The device of claim 10, wherein the determining a difference degree between the advertisement object in the current page sample picture and the advertisement object in the initial pre-stored picture further comprises:

determining that the difference degree is 100% based on detecting that any advertisement object has been added or deleted.

14. The device of claim 10, wherein the monitored page is a rendered web page.

* * * * *